United States Patent
Kagohara et al.

(10) Patent No.: US 6,357,918 B1
(45) Date of Patent: Mar. 19, 2002

(54) SLIDING BEARING AND SLIDING BEARING STRUCTURE

(75) Inventors: Yukihiko Kagohara; Mituru Sugita; Hideo Ishikawa; Takayuki Shibayama, all of Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 09/560,586

(22) Filed: Apr. 28, 2000

(30) Foreign Application Priority Data

Apr. 30, 1999 (JP) .............................. 11-124807

(51) Int. Cl.[7] .............................. F16C 9/02; F16C 33/12
(52) U.S. Cl. ........................ 384/276; 384/288; 384/294
(58) Field of Search .................................. 384/288, 429, 384/430, 434, 294, 276, 913

(56) References Cited

U.S. PATENT DOCUMENTS

| | | | |
|---|---|---|---|
| 4,836,695 A | * 6/1989 | Baureis et al. | 384/276 |
| 4,889,435 A | * 12/1989 | Gojon | 384/276 |
| 5,352,541 A | * 10/1994 | Tanaka et al. | 428/628 |
| 5,545,489 A | * 8/1996 | Tanaka et al. | 428/629 |
| 5,803,614 A | * 9/1998 | Tsuji et al. | 384/276 |
| 5,879,816 A | * 3/1999 | Mori et al. | 384/913 X |
| 6,012,850 A | * 1/2000 | Kagohara et al. | 384/276 |

FOREIGN PATENT DOCUMENTS

| | | |
|---|---|---|
| JP | 61-88020 | 5/1986 |
| JP | 2-89813 | 3/1990 |
| JP | 6-94036 | 5/1994 |

\* cited by examiner

*Primary Examiner*—Thomas R. Hannon
(74) *Attorney, Agent, or Firm*—Browdy and Neimark

(57) ABSTRACT

There is disclosed a sliding bearing provided with a sliding bearing layer and a back metal layer bonded to the outer face of the sliding bearing layer, the back face of which back metal layer being coated with a phosphate coating at a portion where fretting wear is apt to occur while coated with a coating of a thermally good conductor at another portion where no phosphate coating is provided, whereby seizure resistance as well as fretting resistance is improved because the dispersing of heat can be improved by the coating of the thermally good conductor.

13 Claims, 2 Drawing Sheets

B (0°)

SLIDING BEARING AND SLIDING BEARING STRUCTURE

BACKGROUND OF THE INVENTION

The invention relates to a sliding bearing for an internal combustion engine and particularly for receiving dynamic load, and a sliding bearing structure having this sliding bearing.

Recently, in order to achieve a light-weight design, a housing for mounting a sliding bearing is thinned in thickness or is used an aluminum alloy, and resultantly the housing is reduced in rigidity. Thus, in the housing, more micro repetitive strains than before are apt to occur due to the dynamic load. For example, in a big end portion of and in a main bearing portion of a connecting rod for the internal combustion engine, a light-weight design is adopted for achieving a high-speed, high-temperature, and high load design. Between an inner face of a housing corresponding to these big end portion, the main bearing portion, and a back face of a sliding bearing attached thereto, there occur relative micro collision and micro slip due to the repetitive strains of the housing, with the result that damage is apt to occur due to fretting wear.

To cope with the fretting wear, there have been hitherto known a sliding bearing in which the back face thereof is provided with a coating layer made of a resin such as PTFE superior in lubrication, and another sliding bearing in which the back face thereof is provided with a coating layer formed by plating silver or copper.

In JP-A-61-88020 there is disclosed a sliding bearing provided on the back face thereof with a coating layer made of a copper alloy or a nickel alloy or an aluminum alloy which coating layer has a hardness of 15 to 80 Hv. By this soft metal coating layer, it is said that the occurrence of the fretting wear is restrained.

In JP-A-2-89813 there is disclosed a sliding bearing having a composite plating layer as a coating layer thereof which composite plating layer is formed by precipitating PTFE in the plating layer of Ni or Co. In this sliding bearing, in order to prevent the plating layer from being peeled off from the back metal of the sliding bearing due to the inferior adherence of PTFE, the composite plating layer of both the PTFE and Ni or Co is provided. By preventing the PTFE with a low friction coefficient from being peeled off, it is said that the fretting corrosion resistance can be fairly improved.

In JP-A-6-94036 according to the present applicant is disclosed a sliding bearing having a phosphate coating as a coating layer. This is one in which the fretting resistance is improved by providing the phosphate coating low in friction coefficient.

However, insofar as the soft coating layer disclosed in JP-A-61-88020 made of a metal having a hardness of 15 to 80 Hv is concerned, an adhesion phenomenon is apt to occur between the back face of the bearing and the housing thereof due to insufficient rigidity, therefore the fretting being apt to occur. Thus, it has been impossible to obtain sufficient fretting resistance insofar as only such means as the soft metal coating layer is concerned.

Further, regarding a coating layer made of both of PTFE and a metal such as Ni which coating layer is disclosed in JP-A-2-89813, due to micro friction occurring between the back face of a bearing and the housing thereof, there still remained such a problem as PTFE is apt to be peeled off, so that it was impossible to obtain sufficient fretting resistance.

Further, after repeating the researching of the phosphate coating disclosed in JP-A-6-94036 according to the present applicant, it has found that the provision of the phosphate coating makes the fretting resistance superior but makes the seizure resistance deteriorated due to the low thermal conductivity thereof.

THE OBJECT OF THE INVENTION

The object of the invention is to obtain a sliding bearing having both superior fretting resistance and superior seizure resistance, in which a phosphate coating is formed only at a portion at which fretting wear is apt to occur, no phosphate coating being provided at another portion other than the first portion, in which another portion a thermally good conductive coating is formed to enhance the heat-dissipating ability thereof.

In accordance with an aspect of the invention, there is provided a sliding bearing comprising a back metal layer having an inner face and a back face, a sliding layer bonded to said inner face of the back metal layer, a phosphate coating provided at a portion of said back face of said back metal layer at which portion fretting wear is apt to occur, and a thermally conductive coating having superior thermal conductivity which thermally conductive coating is provided at another portion of said back face which another portion is provided with no phosphate coating.

As a sliding bearing to which the invention is applied, it is possible to suitably adopt a double-layers-bearing in which a sliding layer of an alloy or a resin is formed on a back metal, or a tri-layers-bearing further provided with an overlay. As the alloy, it is possible to select one of such aluminum-based alloys, copper-based alloys and etc as to have been publicly known hitherto. As the resin, it is possible to suitably select a publicly known one of polyimide resin, polyamide-imide resin and a resin including one of these resin as a main constituent thereof. Further, as the overlay, it is also possible to suitably select a publicly known one of Pb-based alloy, Sn-based alloy and etc.

As the back metal, a cold rolled, soft steel sheet can be used properly, however, without being limited to this kind, it is possible to suitably use any one. Particularly, it is preferred to use a low carbon steel which is readily worked. As the phosphate coating, a usually used representative is one selected from zinc phosphate, manganese phosphate, zinc-calcium phosphate and ferrous phosphate. In these phosphates, the zinc phosphate has acicular crystals stacked obliquely, each of the manganese phosphate and the zinc-calcium phosphate being provided with crystals of a hexahedron, and the ferrous phosphate has columnar crystals of an indefinite shape.

Further, regarding the thickness of the phosphate coating, it is preferable to provide a phosphate coating of an about 2 to 30 $\mu$m in total in thickness on the inner face of the housing and/or on the back face of the back metal. In a case where the thickness of the phosphate coating is less than 2 $\mu$m, the wear resistance thereof becomes insufficient. In another case where the thickness thereof exceeds 30 $\mu$m, the phosphate coating is apt to be peeled off. Particularly, the thickness value thereof in the range of 4 to 20 $\mu$m is preferred in view of the respect of the good durability.

The phosphate coating is formed at a portion where the fretting wear is apt to occur. In explaining the portion in which the fretting wear is apt to occur, this portion means an angular range of the portion "A" in FIG. 1 where relative micro collision and/or micro slippage occurs due to the repetitive strains of a housing 2 between the inner face of the housing 2 and the back face of a sliding bearing 1. Namely, regarding the maximum load position "B" (which is, in FIG.

1, assumed to be the lowest position), the fretting wear is apt to occur most intensively at two portions each ranging ±10 degrees from each of radial lines C which are circumferentially spaced by 45 degrees clockwise and counter-clockwise from the maximum load position "B". Thus, it is necessary to provide the phosphate coating at each of the two portions each circumferentially ranging from the radial line C to ±10 degrees. Further, the broader the range of the phosphate coating circumferentially provided becomes, the more the lowering of the heat-dispersing property becomes.

Further, on another portion of the back face other than the above portion at which the phosphate coating is provided, a coating of a material having a thermally good conductivity is formed so that seizure resistance is further enhanced because of the acceleration of heat dispersion achieved by the thermally good conductive coating.

As the thermally good conductive coating, it is possible to use a metal usually represented by copper, silver, nickel, aluminum and etc.

In a case where a sliding bearing structure is formed by combining two half-bearings (, a term "a half-bearing" being used when a single piece is meant,), the phosphate coating may be formed on the whole of the back phosphate coating may be formed on another half-bearing located at a non-load side. According to this, the phosphate coating may be formed on the whole back face regarding one of the half-bearings, and on another half-bearing is needed no phosphate coating treatment, so that the production of a sliding bearing can be performed readily.

Further, at the time of the production, it is possible to form a coating of a thermally good conductive material such as copper on a half-bearing located at a non-load side, whereby it becomes possible to obtain a bearing structure having further improved seizure resistance in comparison with that of the above case of no phosphate coating on the non-load side.

As regards the phosphate coating, it may be formed either one of the inner face of the housing and the back face of the back metal layer of a sliding bearing, or may be formed on both of them.

In another aspect of the invention, the phosphate coating is formed on a portion of the back face of a sliding bearing at which portion the fretting wear is apt to occur, and a coating of a material having thermally good conductivity is formed on another back face portion where no phosphate coating is formed, whereby it becomes possible to produce a sliding bearing structure having both superior fretting resistance and superior seizure resistance.

In accordance with still another aspect of the invention, there is provided a sliding bearing structure in which two half-bearings each having a semi-circular shape is combined, in which structure a coating of a material having thermally good conductivity is formed on the whole face of the back face of one half-bearing located at a load side, and in which structure no phosphate coating is formed on another half-bearing located at a non-load side, whereby it becomes possible to produce a sliding bearing structure having both superior fretting resistance and superior seizure resistance.

DETAILED DESCRIPTION OF THE PREFERRED EMBODIMENTS OF THE INVENTION

Figure 1:
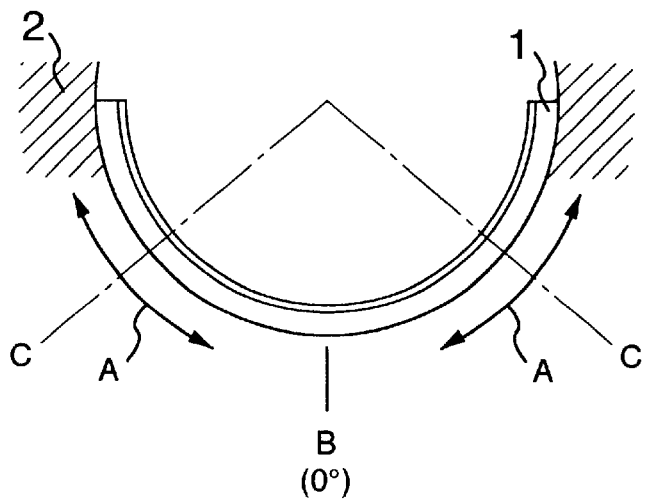
FIG. 1 is a side view of a half sliding bearing for explaining an area where a phosphate coating is formed.

The embodiments of the invention are explained below.

The experiments were performed, as shown in Table 1, regarding each of experimental samples prepared in accordance with embodiments 1 to 10 and comparison examples 1 to 5. As a back metal, a cold-rolled steel sheet (prescribed in JIS G3141SPCC) was used. For example, in the embodiment 1, a half sliding bearing was produced by the steps of: forming a bearing alloy layer of Cu—1.5 wt. %Sn—23 wt. %Pb on this back metal by sintering to thereby obtain a composite sheet, and cutting and shaping this composite sheet into a semicircular shape to thereby obtain the half sliding bearing having an inner diameter of 42 mm, an outer diameter of 45 mm and a width of 17 mm. Further, on the bearing alloy layer, an overlay of Pb—10 wt %Sn—10 wt. %In was formed which had a thickness of 15 $\mu$m.

On the other hand, the back face of the back metal of the half sliding bearing was plated with a metal coating of 2 $\mu$m in thickness which became a thermally good conductive coating as explained below. Then, a portion of the back face of the back metal which portion was to be coated with a phosphate coating were exposed by abrading the plating coating.

The phosphate coating was provided on the portion by immersing for four minutes the half sliding bearing in a phosphate treatment liquid (having a phosphate concentration of 30 g/l) held at 94° C. By use of this treatment, there were provided such various phosphate coatings as manganese phosphate, zinc phosphate, zinc-calcium phosphate and ferrous phosphate disclosed in Table 1, each of which coatings had a thickness of about 6 $\mu$m and a grain size of about 9 $\mu$m.

As regards the positions of the phosphate coating, since the maximum load portion (B) in a hydraulic vibration-testing machine explained below was located at the lowest position of the sliding bearing, the phosphate coating was formed on various areas shown in Table 1 so that the phosphate coating may covers positions (C) defined by 45 degrees when measured clockwise and counter-clockwise from the maximum load portion (B) along the outer face of the half sliding bearing. By combining each of the half sliding bearings thus obtained with another half sliding bearing on which neither good conductive coating nor phosphate coating was provided, each of the sliding bearings subjected to the testing was obtained. In Table 1, each of the areas where the phosphate coatings are provided is an area defined by radii spaced clockwise and counter-clockwise by each angle (disclosed in Table 1) from the standard angle (0 degree) of the maximum load position (B).

On the other hand, in the comparison examples, the testing was performed regarding each of the combinations where both of a half sliding bearing located at a load side and another sliding bearing located at a non-load side are provided with no phosphate coating.

TABLE 1

| | sliding layer | Overlay | phosphate coating kind | Range of the coating (degree) | kind of thermally good conductor |
|---|---|---|---|---|---|
| Embodiments of the invention | | | | | |
| 1 | Cu—Pb base alloy | Pb—In base alloy | manganese phosphate | 20 to 90 right and left* | Ag |
| 2 | Cu—Pb base alloy | Pb—Sn base alloy | manganese phosphate | 25 to 90 right and left* | Ni |
| 3 | Cu—Pb base alloy | Pb—Cu base alloy | manganese phosphate | 20 to 70 right and left* | Cu |
| 4 | Al—Sn base alloy | — | manganese phosphate | the whole face | — |
| 5 | Cu—Pb base alloy | Pb—In base alloy | manganese phosphate | the whole face | — |
| 6 | Cu—Pb base alloy | Pb—Cu base alloy | zinc phosphate | 25 to 75 right and left* | Ni |
| 7 | Al—Zn base alloy | Pb—Sn base alloy | zinc phosphate | 30 to 90 right and left* | Cu |
| 8 | Cu—Pb base alloy | Al—Sn base alloy | zinc phosphate | 20 to 90 right and left* | Al |
| 9 | Al—Sn base alloy | Sn base alloy | zinc-calcium phosphate | 25 to 80 right and left* | Ni |
| 10 | Al—Zn base alloy | Pb—Sn base alloy | ferrous phosphate | 30 to 90 right and left* | Cu |
| Comparison Examples | | | | | |
| 1 | Cu—Pb base alloy | Pb—In base alloy | — | — | — |
| 2 | Al—Zn base alloy | Pb—Sn base alloy | — | — | Cu |
| 3 | Cu—Pb base alloy | Pb—Cu base alloy | — | — | Ni |
| 4 | Cu—Pb base alloy | Pb—In base alloy | — | — | Ag |
| 5 | Al—Sn base alloy | — | — | — | Al |

*This means that the coating is formed at each of two angular ranges each defined between 20 and 90 degrees when measured from a maximum load position clockwise or counterclockwise.

Figure 2A:
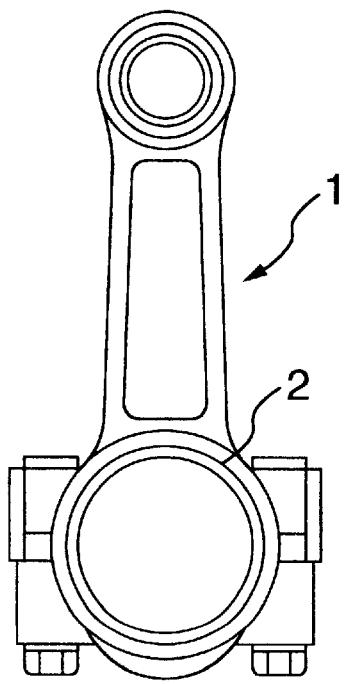
FIG. 2A is a front view explaining a hydraulic vibration test.
Figure 2B:
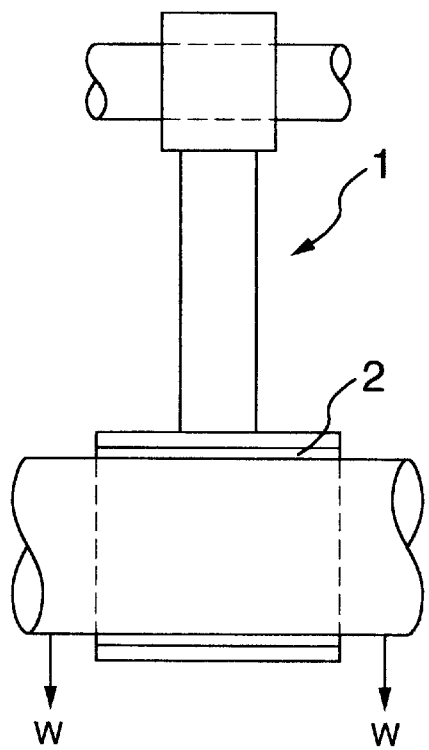
FIG. 2B is a side view explaining the hydraulic vibration test.
Figure 3:
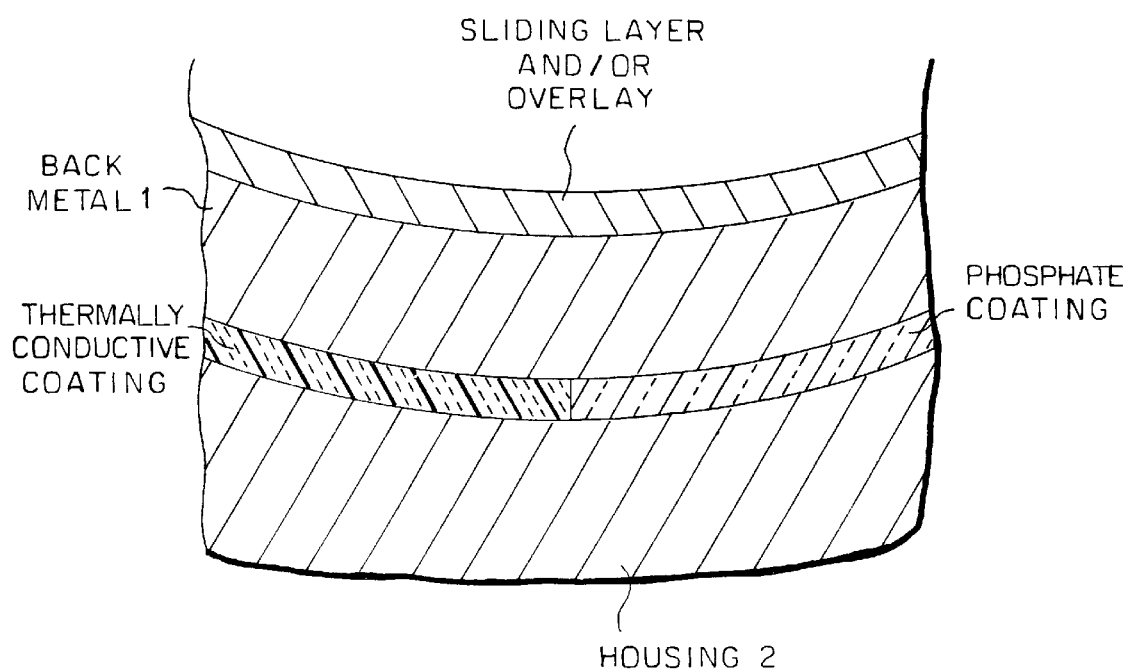
FIG. 3 is an enlarged view of a section of FIG. 1.

Each sample according to each of the embodiments and comparison examples was subjected to a vibration test by use of a hydraulic vibration testing machine. As shown in FIGS. 2A and 2B, in the vibration test, each of the sliding bearings according to the embodiments of the invention and according to the comparison examples was mounted in a housing which was a big end portion of a connecting rod of an automobile engine, and vibration load was applied to the sliding bearing under the condition shown in Table 2. The evaluation thereof was performed by observing with naked eye whether or not any damage due to fretting occurred. As the result thereof, in each of the embodiments of the invention, no damage due to the fretting was occurred, and on the other hand, in all of the comparison samples, damage due to the fretting was observed.

TABLE 2

| | Vibration test | |
|---|---|---|
| Item | dimension | unit |
| clearance | 0.100 | mm |
| test load | 34.3 | KN |
| wave shape of the test load | sine wave | — |
| frequency | 60 | Hz/sec |
| cycle number | 5 × $10^6$ | times |

TABLE 3

| | Results of the Tests | |
|---|---|---|
| | fretting | Specific load of seizure occurrence (MPa) |
| Embodiments of the invention | | |
| 1 | non | 78 |
| 2 | non | 87 |
| 3 | non | 82 |
| 4 | non | 80 |
| 5 | non | 73 |
| 6 | non | 83 |
| 7 | non | 93 |
| 8 | non | 84 |
| 9 | non | 86 |
| 10 | non | 93 |
| Comparison Samples | | |
| 1 | occurred | 78 |
| 2 | occurred | 95 |
| 3 | occurred | 89 |
| 4 | occurred | 81 |
| 5 | occurred | 88 |

Next, a seizure test was performed, in which there were adopted the following conditions: a running-in thereof for one hour was performed at a rotation rate of 7200 rpm regarding each of the samples under no load while using a lubricating oil of SAE No.20 previously heated up to 100° C., a load of 10 MPa being then applied to each of the samples while reducing the lubricating oil down to 150 ml/minute, and thereafter an accumulative load 5 MPa was added every 10 minutes. In the seizure test, when the temperature of the back face of the sliding bearing exceeded 200° C. or when a value of current flowing a machine for rotating a shaft on which the sliding bearing was mounted exceeded 15 amperes, it was decided that seizure occurred. The results thereof are shown in Table 3.

As shown in Table 1, in Embodiment 1, manganese phosphate is coated at the portion where fretting wear is apt to occur, and a coating of thermally good conductor Ag is coated on a portion other than the phosphate-coated portion. On the other hand, in Comparison Example 1 no phosphate is coated thereon.

In comparing these samples with each other, no fretting wear was observed in Embodiment 1, however, in Comparison Example 1 damage due to fretting occurred. As regards the seizure resistance, the specific load of seizure occurrence of Embodiment 1 is equivalent to that of Comparison Example 1.

From these experimental results, it becomes apparent that, by partially providing the coating of the thermally good conductor, seizure resistance as well as fretting resistance can be improved.

Incidentally, in each of the embodiments explained above, the maximum load portion (B) is assumed to be located at the lowest position of the sliding bearing, however, the location of the maximum load portion varies in accordance with the variation of a sliding bearing structure, and the bearing structure of the invention can be applied to the maximum load portion thereof.

What is claimed is:

1. A sliding bearing comprising a back metal layer having an inner face and a back face, a sliding layer bonded to said inner face of the back metal layer, a phosphate coating provided at a portion of said back face of said back metal layer at which portion fretting wear is apt to occur, and a thermally conductive coating having superior thermal conductivity which coating is provided at another portion of said back face which another portion is provided with no phosphate coating.

2. A sliding bearing according to claim 1, wherein said phosphate coating is either acicular crystals or columnar crystals of any one selected from the group consisting of manganese phosphate, zinc phosphate, zinc-calcium phosphate, ferrous phosphate.

3. A sliding bearing according to claim 2 wherein said thermally conductive coating is made of one selected from the group consisting of copper, silver, nickel, aluminum, and alloy of each of these elements.

4. A sliding bearing according to claim 2 wherein said phosphate coating is provided in two ranges each defined from 20 to 90 degrees at maximum when measured clockwise or counterclockwise from a maximum load position of the bearing along the back face of said metal layer.

5. A sliding bearing according to claim 1, wherein said thermally conductive coating is made of one selected from the group consisting of copper, silver, nickel, aluminum, and alloy of each of these elements.

6. A sliding bearing according to claim 1, wherein said phosphate coating is provided in two ranges each defined from 20 to 90 degrees at maximum when measured clockwise or counterclockwise from a maximum load position of the bearing along the back face of said back metal layer.

7. A sliding bearing structure comprising two, combined half sliding bearings each provided with a semi-circular circular shape, and a housing having an inner face, said half sliding bearings being mounted on said inner face of said housing, one of said half sliding bearings being located at a load side of said bearing structure and being provided on whole back face thereof with a phosphate coating, and another half sliding bearing being located at a non-load side of said bearing structure and being provided on a back face thereof with no phosphate coating.

8. A sliding bearing structure according to claim 7, wherein said phosphate coating is provided in two ranges each defined from 20 to 90 degress at maximum when measured clockwise or counterclockwise from a maximum load position of the bearing along along the back face of said back metal layer.

9. A sliding bearing structure comprising two, combined half sliding bearings each provided with a semi-circular shape, and a housing having an inner face, said half sliding bearings being mounted on said inner face of said housing, one of said half sliding bearings being located at a load side of said bearing structure and being provided on whole back face thereof with a phosphate coating, and another half sliding bearing being located at a non-load side of said bearing structure and being provided on a back face thereof with a thermally good conductive coating made of a soft material.

10. A sliding bearing structure comprising:
    a sliding bearing having a back metal layer with an inner face and a back face, and a sliding bearing layer bonded to the inner face of said back metal layer; and
    a housing with an inner face,
    said sliding bearing being mounted on the inner face of the housing,
    said inner face of the housing being provided with a phosphate coating at a portion of said inner face of the housing which portion corresponds to a location where fretting wear is apt to occur on said back face of the back metal layer of the sliding bearing.

11. A sliding bearing structure according to claim 10, wherein said phosphate coating is provided in two ranges each defined from 20 to 90 degrees at maximum when measured clockwise or counterclockwise from a maximum load position of the bearing along the back face of said back metal layer.

12. A sliding bearing structure comprising two, combined half sliding bearings each provided with a semicircular shape, and a housing having an inner face, said half sliding bearings being mounted on said inner face of said housing, one of said half sliding bearings being located at a load side of said bearing structure and being provided with a phosphate coating on each of two ranges each defined from 20 to 90 degrees at maximum when measured clockwise and counterclockwise from an maximum load position of the bearing along the back face of said metal layer, and another half sliding bearing being located at a non-load side of said bearing structure and being provided on a back face thereof with a thermally good conductive coating made of a soft material.

13. A housing used in a sliding bearing structure, said sliding bearing structure comprising a sliding bearing having a back metal layer with an inner face and a back face, and a sliding bearing layer bonded to the inner face of said back metal layer, said sliding bearing being mounted on the inner face of the housing,
    said housing comprising an inner face provided with a phosphate coating at a portion of said inner face which corresponds to a location where fretting wear is apt to occur on said back face of the back metal layer of the sliding bearing.

* * * * *